(12) United States Patent
Gerlach

(10) Patent No.: US 10,182,365 B2
(45) Date of Patent: Jan. 15, 2019

(54) METHODS, APPARATUS AND COMPUTER PROGRAMS FOR CAPTURING MEASUREMENT RESULTS OF MOBILE DEVICES

(71) Applicant: VOLKSWAGEN AG, Wolfsburg (DE)

(72) Inventor: Simon Gerlach, Meine (DE)

(73) Assignee: Volkswagen AG (DE)

(*) Notice: Subject to any disclaimer, the term of this patent is extended or adjusted under 35 U.S.C. 154(b) by 0 days.

(21) Appl. No.: 15/611,164

(22) Filed: Jun. 1, 2017

(65) Prior Publication Data

US 2017/0353880 A1 Dec. 7, 2017

(30) Foreign Application Priority Data

Jun. 1, 2016 (DE) .......................... 10 2016 209 568

(51) Int. Cl.
*H04W 4/02* (2018.01)
*H04W 4/021* (2018.01)
*H04W 88/02* (2009.01)
*H04W 24/08* (2009.01)
*G09B 29/00* (2006.01)
*H04W 4/04* (2009.01)

(52) U.S. Cl.
CPC .......... *H04W 24/08* (2013.01); *G09B 29/006* (2013.01); *H04W 4/02* (2013.01); *H04W 4/021* (2013.01); *H04W 4/046* (2013.01); *H04W 88/02* (2013.01)

(58) Field of Classification Search
CPC ....... H04W 4/02; H04W 4/043; H04W 4/021; H04W 4/90; G01C 21/206
See application file for complete search history.

(56) References Cited

U.S. PATENT DOCUMENTS

| | | | | |
|---|---|---|---|---|
| 6,434,364 B1* | 8/2002 | O'Riordain | ........... | H04W 24/00 455/419 |
| 9,609,620 B1* | 3/2017 | Bitra | .................... | H04W 64/003 |
| 2009/0310501 A1* | 12/2009 | Catovic | ................. | H04W 24/08 370/252 |
| 2012/0329507 A1* | 12/2012 | Watanabe | ............. | H04W 24/10 455/517 |
| 2013/0012231 A1 | 1/2013 | Hall | | |

(Continued)

FOREIGN PATENT DOCUMENTS

| | | |
|---|---|---|
| DE | 10041277 A1 | 5/2001 |
| DE | 102005013799 A1 | 10/2005 |

(Continued)

*Primary Examiner* — Dung Hong
(74) *Attorney, Agent, or Firm* — Barnes & Thornburg LLP

(57) ABSTRACT

Methods, apparatuses and computer programs for acquiring and providing measurement results from mobile devices. Disclosed is a method for providing information about a measurement result of a mobile device which includes obtaining a data message containing information about a measurement job. The information about the measurement job includes information about a geographical area in which the measurement job is to be carried out. The method further includes determining whether the mobile device is within the geographical area, determining the measurement result based on the information about the measurement job if the mobile device is within the geographical area, and providing the information about the measurement result based on the determined measurement result.

15 Claims, 3 Drawing Sheets

(56) References Cited

U.S. PATENT DOCUMENTS

| | | | |
|---|---|---|---|
| 2013/0275214 A1* | 10/2013 | Kote | G06Q 30/0255 |
| | | | 705/14.53 |
| 2014/0044002 A1* | 2/2014 | Fujishiro | H04W 24/10 |
| | | | 370/252 |
| 2014/0149032 A1 | 5/2014 | Barrett et al. | |
| 2014/0280318 A1 | 9/2014 | Simms et al. | |
| 2014/0315496 A1* | 10/2014 | Hamada | H04W 24/10 |
| | | | 455/67.11 |
| 2015/0237193 A1* | 8/2015 | Zeilingold | H04M 1/72572 |
| | | | 455/418 |
| 2015/0350748 A1* | 12/2015 | Abuelsaad | H04Q 9/00 |
| | | | 340/870.07 |
| 2015/0379114 A1 | 12/2015 | Onishi et al. | |
| 2016/0029224 A1* | 1/2016 | Edge | G01S 5/0252 |
| | | | 455/456.1 |
| 2017/0066452 A1* | 3/2017 | Scofield | B60W 50/14 |
| 2017/0285656 A1* | 10/2017 | Kohlenberg | G05D 1/0276 |
| 2017/0318117 A1* | 11/2017 | Stenneth | H04Q 9/00 |

FOREIGN PATENT DOCUMENTS

| | | |
|---|---|---|
| DE | 102013112787 A1 | 5/2015 |
| DE | 102013225497 A1 | 6/2015 |

* cited by examiner

METHODS, APPARATUS AND COMPUTER PROGRAMS FOR CAPTURING MEASUREMENT RESULTS OF MOBILE DEVICES

PRIORITY CLAIM

This patent application claims priority to German Patent Application No. 10 2016 209 568.4, filed 1 Jun. 2016, the disclosure of which is incorporated herein by reference in its entirety.

SUMMARY

Illustrative embodiments relate to methods, apparatuses and computer programs for providing and acquiring measurement results from mobile devices, more precisely, but not exclusively, based on confinement of a measurement job to a geographical area.

BRIEF DESCRIPTION OF THE DRAWINGS

Further configurations are described in more detail below on the basis of the exemplary embodiments depicted in the drawings, to which, however, exemplary embodiments generally are not restricted overall. In the drawings.

DETAILED DESCRIPTION

Figure 1:
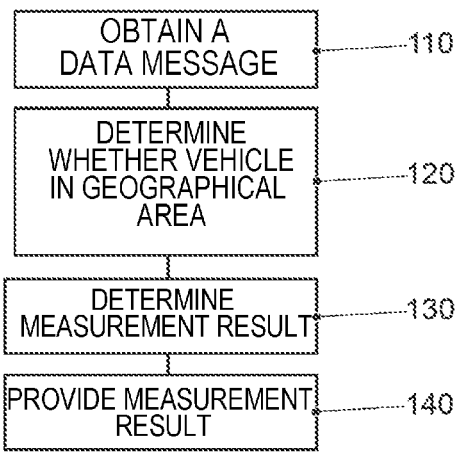
FIG. 1 illustrates a flowchart for an exemplary embodiment of a method for providing information about a measurement result of a vehicle.

Today, modern mobile devices frequently have a multiplicity of sensors: acceleration sensors, brightness sensors, position sensors, and also (if the mobile device is a vehicle or by means of the connection to a vehicle) rain sensors, distance sensors, rear cameras, tire pressure sensors or temperature sensors, are merely a brief overview of a broad area. The sensors are frequently used to allow convenience and safety functions. By way of example, in many mobile devices, for example in vehicles, detection of rain by a rain sensor can be used to activate windshield wipers, brightness sensors can be used to automatically activate headlamps of the vehicle or further lighting of the mobile device when it is dark, and distance sensors assist collision avoidance or automatic or assisted parking of the vehicle.

A further trend is the networking of mobile devices. By way of example, mobile devices may be connected to a central server and interchange data by means of a mobile radio link. Alternatively or additionally, mobile devices, for example vehicles, may be connected to one another or to transceivers at the edge of the road directly, for example by means of shorthaul radio links or by means of vehicle-to-vehicle communication (also called Car2Car, C2C, or Vehicle2Vehicle, V2V) or vehicle-to-infrastructure communication (also called Car2Infrastructure, C2I, or Vehicle2Roadside, V2R). The communication in this instance may be limited to between mobile devices or between mobile devices and traffic infrastructure within a radius of a few hundred meters, for example, or can alternatively be provided by means of a cellular mobile radio link.

Patent application DE 10 2013 225 497 A1 relates to a method for assisting data communication between a computation device of a vehicle and a service server using an assistance system, based on a georeference and an associated, map-specific map reference in a digital map. DE 100 41 277 A1 shows a method and a system for autonomously developing or expanding geographical databases through the use of uncoordinated measurement data. US 2014/0280318 A1 shows use of a model of a geographical region in which tiles are determined by means of overlapping geometries that can be used to identify locations.

There is the need for an improved design for the remote acquisition of sensor data from mobile devices.

Exemplary embodiments afford a method for providing information about a measurement result of a mobile device, for example a programmable mobile phone or a smartphone. Analyses of sensor data are frequently confronted by a dilemma: first, it is frequently desirable to use sensor data across multiple devices to allow queues or weather conditions to be identified, for example. Secondly, it is frequently not necessary for all connected devices to provide sensor data for this purpose, since the volume of data to be analyzed would sometimes be too large. To identify the mobile devices whose sensor data are of interest, a position of the mobile device is frequently of interest. For data protection reasons, the extensive acquisition of the positions of the mobile devices is possibly contentious, however. At least some exemplary embodiments may be based on providing a data message containing a measurement job for a plurality of mobile devices. The data message containing the measurement job comprises information about a geographical area in which the measurements are intended to take place. At least some exemplary embodiments in this case are based on data-protection-compliant coding of location confinements. In some exemplary embodiments, a mobile device may be designed to assign a locally confined measurement job without the mobile device disclosing its position to the backend for this purpose. If a mobile device is within the geographical area, then it can determine and provide the sensor/measurement data. By way of example, the information about the geographical area may be geocoded in this instance, for example by means of a geohashing method. Depending on the length of the code/hash used, the granularity of the geographical area can vary. At least some exemplary embodiments in this case are based on a division of work between backend and vehicle: a backend (for example a server entity of the device manufacturer) can send the description of the geometry of potentially relevant measurement jobs to the mobile device, and the latter can locally perform the check to determine whether its current position is actually comprised in the location confinement.

Exemplary embodiments afford a method for providing information about a measurement result of a mobile device. By way of example, the mobile device can correspond to a vehicle or a programmable mobile phone. The method comprises obtaining a data message containing information about a measurement job. The information about the measurement job comprises information about a geographical area in which the measurement job is to be carried out. The method further comprises determining whether the mobile device is within the geographical area. The method further comprises determining the measurement result based on the information about the measurement job if the mobile device is within the geographical area. The method further comprises providing the information about the measurement result based on the determined measurement result. Obtaining the information about the geographical area in the measurement job allows local restriction of the mobile devices that provide measurement results without the mobile device needing to disclose its explicit position. Further, by way of example, it is possible to reduce or avoid a volume of data that accrues if a server system monitors the position of a multiplicity of mobile devices, and also a computation complexity for monitoring the positions.

In some exemplary embodiments, the information about the geographical area can comprise a coded delimitation of the geographical area. By way of example, the coded delimitation of the area can be based on a geohashing method (geographical hash function). By way of example, the coded delimitation of the geographical area can reduce a volume of data for a representation of the geographical area.

In some exemplary embodiments, the geographical area may be comprised in a reference system that comprises a plurality of granularities. By way of example, the reference system can comprise a first plurality of sections in a first granularity from the plurality of granularities. Sections from the first plurality of sections can comprise a second plurality of sections in a second granularity, for example geographical areas from the first plurality of sections can comprise the geographical areas of the second plurality of sections. The information about the geographical area can identify at least one section that is comprised in the reference system. This allows data-saving transmission of the geographical area without the use of a digital roadmap being necessary.

In at least some exemplary embodiments, the information about the geographical area can identify the at least one section and sections that comprise the at least one section. By way of example, the plurality of granularities can correspond to hierarchic levels. A section in a higher hierarchic level (the first granularity) can comprise a plurality of sections (for example the second plurality of sections) in a lower hierarchic level (the second granularity), wherein the information about the geographical area can identify, for example by means of a hierarchically constructed character string, both a section from the lower hierarchic level and a section from the higher hierarchic level that comprises the section from the lower hierarchic level.

In some exemplary embodiments, the information about the geographical area can comprise information about a position statement and information about a granularity of the position statement. The information about the granularity can indicate the extent of the geographical area around the position statement. The method can further comprise determining the geographical area based on the information about the position statement and based on the information about the granularity of the position statement. The computing of the geographical area based on the information about the position statement and the information about the granularity can reduce a volume of data for a representation of the geographical area, for example.

In at least some exemplary embodiments, the information about the granularity can comprise information about a size of the geographical area. The determining of the geographical area can be based on the information about the size of the geographical area, for example. In at least some exemplary embodiments, the information about the size of the geographical area can comprise at least one element from the group comprising an edge length, a diameter, a radius and a scaling. The obtaining of the information about a size can reduce a volume of data for a representation of the geographical area, for example.

In some exemplary embodiments, the information about the geographical area can comprise a plurality of position statements that define a polygon. By way of example, the plurality of position statements can be used to delimit a complex geographical domain. By way of example, the geographical area can correspond to a geographical domain.

In at least some exemplary embodiments, the information about the measurement job can comprise information about a plurality of geographical areas. By way of example, concatenation of multiple geographical areas in a measurement job can allow a definition of more complex geographical areas.

In some exemplary embodiments, the information about the measurement job can further comprise information about a validity period of the measurement job. The method further comprises storing the measurement job during the validity period of the measurement job, for example if the mobile device is not within the geographical area during determination of whether the mobile device is within the geographical area. By way of example, the determining of the measurement result can be carried out when the mobile device is within the geographical area at a time within the validity period of the measurement job. As such, the measurement job can be carried out at a later time, for example.

In some exemplary embodiments, the obtaining of the data message can further comprise checking whether the measurement job is relevant to the mobile device. The determining of the measurement result can further be based on whether the measurement job is relevant to the mobile device. By way of example, the relevance of the measurement job to the mobile device can be based on at least one element from the group comprising type of the mobile device, model of the mobile device, age of the mobile device and current state of the mobile device. By way of example, the determining of the measurement results can be performed if the measurement job is relevant to the mobile device. This can avoid measurement of data that are not needed for the measurement job.

Exemplary embodiments further afford a method for acquiring measurement results of a first plurality of mobile devices. The method comprises determining a data message containing information about a measurement job. The information about the measurement job comprises information about a geographical area in which the measurement job is to be carried out. The method further comprises providing the data message containing the information about the measurement job to a second plurality of mobile devices. The second plurality of mobile devices comprises the first plurality of mobile devices. The method further comprises obtaining information about the measurement results of the first plurality of mobile devices. The providing of the information about the geographical area in the measurement job allows local restriction of the mobile devices that provide measurement results without the mobile device needing to disclose its explicit position.

In at least some exemplary embodiments, the method can further comprise obtaining the measurement job and checking the measurement job for whether the position of the second plurality of mobile devices is relevant to the measurement job. The determining of the data message can be based on whether the position of the second plurality of mobile devices is relevant to the measurement job. By way of example, the data message can comprise the information about the geographical area if this is relevant to the measurement job, otherwise it is possible for a generic geographical area (which may be independent of a digital road map) to be comprised in the data message, for example.

In some exemplary embodiments, the method can further comprise checking whether the measurement job is relevant to the second plurality of mobile devices. By way of example, the relevance of the measurement job for the mobile devices from the second plurality of mobile devices can be based on at least one element from the group comprising type of the mobile device, model of the mobile device, age of the mobile device and current state of the mobile device. The method can, by way of example, further comprise restriction of the second plurality of mobile devices based on the relevance of the measurement job to the mobile devices. By way of example, the measurement job can be provided to mobile devices (from the second plurality of mobile devices) to which the measurement job is relevant.

In some exemplary embodiments, the method can further comprise determining a subset of transmission devices from a plurality of transmission devices based on the geographical area. The providing of the data message can be based on the subset of transmission devices, for example. This makes it possible to achieve, by way of example, a first restriction of the mobile devices that obtain the data message; by way of example, the data message can be provided to transmission devices that are within or close to the geographical area.

In some exemplary embodiments, the plurality of transmission devices can comprise one or more mobile radio base stations. The determining of the subset of transmission devices can select, by way of example, at least one base station from the one or more mobile radio base stations for the subset of transmission devices if a coverage area of the at least one base station forms an intersection with the geographical area. This allows the recipients of the message, in some exemplary embodiments, to be confined to surroundings of the geographical area.

In at least some exemplary embodiments, the plurality of transmission devices can comprise one or more transmission devices for a vehicle-to-infrastructure communication. The determining of the subset of transmission devices can select at least one transmission device from the one or more transmission devices for the vehicle-to-infrastructure communication for the subset of transmission devices if a coverage area of the at least one transmission device forms an intersection with the geographical area. This allows the recipients of the message, in some exemplary embodiments, to be confined to surroundings of the geographical area.

In some exemplary embodiments, the method can further comprise filtering the information about the measurement results, for example based on the geographical area. By way of example, it is thus possible to filter out measurement results that come from measurements for which there are already sufficient measurement results.

Exemplary embodiments further afford a program having a program code for performing at least one of the methods when the program code is executed on a computer, a processor, a control module or a programmable hardware component.

Exemplary embodiments further afford an apparatus for providing information about a measurement result of a mobile device. The apparatus comprises an interface, designed to obtain a data message containing information about a measurement job. The information about the measurement job comprises information about a geographical area in which the measurement job is to be carried out. The apparatus further comprises a locating module, designed to determine a position of the mobile device. The apparatus further comprises a control module, designed to control the interface and relocating module. The control module is further designed to determine whether the mobile device is within the geographical area based on the position of the mobile device. The control module is further designed to determine the measurement result by means of a sensor module based on the information about the measurement job if the mobile device is within the geographical area. The control module is further designed to provide the information about the measurement result by means of the interface based on the determined measurement result.

Exemplary embodiments further afford an apparatus for acquiring measurement results of a first plurality of mobile devices. The apparatus comprises an interface, designed to communicate with a second plurality of mobile devices. The second plurality of mobile devices comprises the first plurality of mobile devices. The apparatus further comprises a control module, designed to control the interface. The control module is further designed to determine a data message containing information about a measurement job. The information about the measurement job comprises information about a geographical area in which the measurement job is to be carried out. The control module is further designed to provide the data message containing the information about the measurement job to the second plurality of mobile devices by means of the interface. The control module is further designed to obtain information about the measurement results of the first plurality of mobile devices by means of the interface.

Various exemplary embodiments are now described in more detail with reference to the accompanying drawings, which depict some exemplary embodiments. In the figures, the thickness dimensions of lines, layers and/or regions may be depicted in exaggerated manner for the sake of clarity.

In the description of the enclosed figures below, which show only some exemplary embodiments by way of example, like reference symbols can denote like or comparable components. Further, combinative reference symbols can be used for components and objects that arise repeatedly in an exemplary embodiment or in a drawing, but that are described together for one or more features. Components or objects that are described using like or communitive reference symbols may have single, multiple or all features, for example their dimensionings, embodied in like manner, but possibly also in different manner, unless the description explicitly or implicitly reveals otherwise.

Although exemplary embodiments can be modified and varied in different ways, exemplary embodiments are presented as examples in the figures and are described in detail herein. However, it should be clarified that the intention is not to restrict exemplary embodiments to the respectively disclosed forms, but rather that exemplary embodiments are intended to cover all of the functional and/or structural modifications, equivalents and alternatives that are within the scope of the disclosed embodiments. Like reference symbols denote like or similar elements throughout the description of the figures.

It is noted that one element denoted as "connected" or "coupled" to another element can be directly connected or coupled to the other element or that intervening elements can be present. By contrast, if one element is denoted as "directly connected" or "directly coupled" to another element, no intervening elements are present. Other terms used to describe the relationship between elements should be interpreted in a similar way (e.g., "between" vis-à-vis "directly therebetween", "adjacent" vis-à-vis "directly adjacent", etc.).

The terminology used herein serves only to describe specific exemplary embodiments and is not intended to restrict the exemplary embodiments. As used herein, the singular forms "a" and "the" are also intended to include the plural forms, unless clearly indicated otherwise by the context. Further, it should be clarified that the expressions such as, e.g., "comprises", "comprising", "has" and/or "having", as used herein, indicate the presence of stated features, whole numbers, operations, work sequences, elements and/or components, but do not rule out the presence or the addition of one or more features, whole numbers, operations, work sequences, elements, components and/or groups thereof.

Unless defined otherwise, all terms used herein (including technical and scientific terms) have the same meaning that is ascribed to them by a person of average skill in the art in the field to which the exemplary embodiments belong. Further, it should be clarified that expressions, e.g., those defined in generally used dictionaries, should be interpreted as if they had the meaning that is consistent with their meaning in the context of the relevant art, and should not be interpreted in an idealized or excessively formal sense, as long as this is not expressly defined herein.

Increasing networking of mobile devices, for example vehicles, mobile terminals of a mobile radio communication system and/or programmable mobile phones, allows swarm data functions. This involves data collected by large groups of networked mobile devices being used to obtain higher-quality data, e.g., improve the accuracy of road maps, to determine a traffic situation from motion profiles of mobile devices or to determine a local weather from information about the temperature and rain sensors.

To obtain the necessary data from the mobile devices, it is possibly impractical to always collect all the data from all mobile devices, since this could result in an excessively large volume of data. Instead, it is possible to control specifically which data are to be collected, for example. This can be accomplished by means of what are known as measurement jobs, which are used to prescribe for all mobile devices involved in data acquisition, by means of a central controller (e.g., a server), which data they need to collect and how/to where the data are to be sent.

A possible selection criterion for whether a mobile device is intended to be involved in a particular instance of data collection is the location of the mobile device. The question arises as to how the mobile device or the central controller can check whether a local confinement for an instance of data collection applies to a specific mobile device.

Trivial solutions in which the mobile device has to send its current location to a backend so that the latter can check for whether there are measurement jobs can sometimes be problematic for data protection reasons, since this discloses the location.

If, instead, measurement jobs are delivered to all mobile devices or a multiplicity of mobile devices without checking the location confinement (of a geographical area) and the mobile devices check the location confinement locally, then the location confinement may, by way of example, be described in a form such that it takes up little data volume and can be checked by the mobile devices as easily as possible.

In at least some exemplary embodiments, geohashes of variable length can be used that can be used to code "tiles" of variable size and to describe a complex expanse on the earth's surface as a list of such geohashes. Geohashes (hash function using geographical statements) are a method of coding geographical positions or areas with a high level of efficiency. It is now possible to code the extent of (overlapping) locations such as city quarters, cities, countries, etc. using such geohash lists. The geohashes contained for all managed locations can be sorted into a collective tree, for example. On passage through this data structure, it is then possible to find locations relevant to a given position, for example, e.g., country+possibly city+possibly city quarter. In some exemplary embodiments, it is possible to use a flat list of the geohashes, for example instead of a tree structure, and for the coding and checking of the geographical area to be rendered simpler thereby. The tree structure can afford benefits when there are a relatively large number of entries, for example, e.g., when the mobile device checks a large number of measurement jobs at the same time or a very complex geographical confinement.

In at least some exemplary embodiments, a backend (a central server entity) can send a list of the potentially relevant measurement jobs to a mobile device, for example without the local confinement thereof already being checked in the process. It is possibly already possible for the rest of the criteria to be checked, which are unproblematic from the point of view of data protection.

For a measurement job with local confinement, the local confinement (of a geographical area) can be coded as a list of geopositions with respectively variable granularity in the measurement job. The respectively used granularity can be indicated at the same time, for example, or can be obtained from the longitude of the geoposition. The mobile device may be designed to interpret the received geopositions as tiles (sections) with the edge length of the granularity and the coded location as the center. It may be designed to compare whether it is in one of these tiles. To this end, it may be designed to code its own position using the same method and the same granularity and to compare the result with the received geopositions, for example. In the event of a match, the position of the mobile device is comprised in the location confinement. The mobile device can then take on the applicable measurement job, for example.

At least some exemplary embodiments are based on associating the position of a mobile device with a locally confined measurement job without the mobile device needing to disclose its position to the backend for this purpose.

In this case, the division of work between backend and mobile device can be significant: the backend may be designed to send the description of the geometry of all potentially relevant measurement jobs to the mobile device, which then performs the check, locally to itself, to determine whether its current position is actually contained in the location confinement.

Figure 1A:
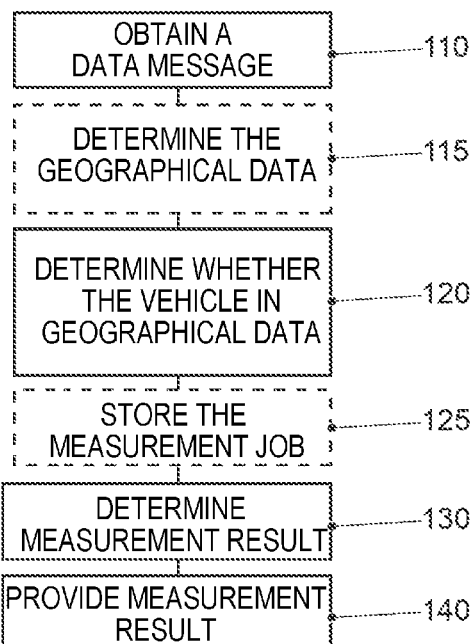
FIG. 1a illustrates a flowchart for a further exemplary embodiment of a method for providing information about a measurement result of a vehicle.
Figure 1B:
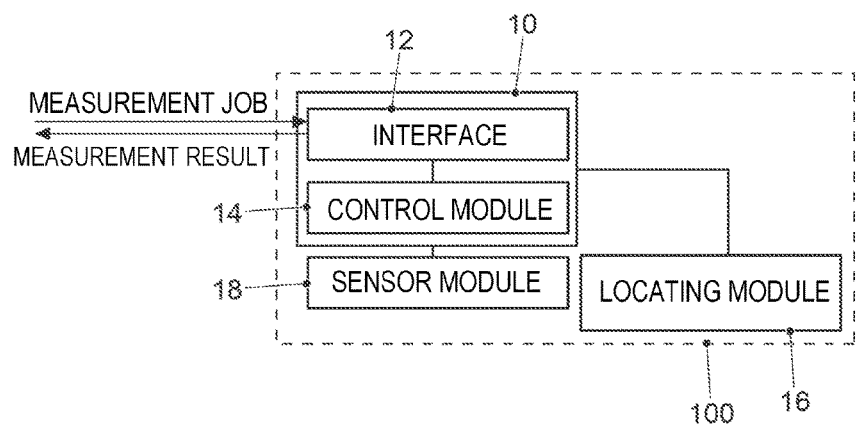
FIG. 1b illustrates a block diagram of an exemplary embodiment of an apparatus for providing information about a measurement result of a vehicle.

FIG. 1 illustrates a flowchart for an exemplary embodiment of a method for providing information about a measurement result of a mobile device 100. FIG. 1*b* illustrates a block diagram of an exemplary embodiment of an apparatus 10, designed to carry out the method for providing the information about the measurement result of the mobile device. The apparatus 10 comprises an interface 12 and a control module 14 that is coupled to the interface 12. The control module 14 is designed to carry out the method operations. By way of example, the control module 14 may be designed to carry out the method operations at 110-140 of FIGS. 1 and 1*a*.

By way of example, the mobile device may correspond to a vehicle, for example an automobile, a motorcycle, a bicycle, a truck, a rail vehicle or a ship, a programmable mobile phone, a mobile terminal (also called user equipment, UE) or a portable computer. Exemplary embodiments further afford a vehicle comprising the apparatus 10. Exemplary embodiments further afford a programmable mobile phone, comprising the apparatus 10.

The method comprises obtaining 110 a data message containing information about a measurement job, for example by means of the interface 12. The information about the measurement job comprises information about a geographical area in which the measurement job is to be carried out. By way of example, the measurement job can comprise information about which measurements are to be carried out or which measurement parameters are to be used).

By way of example, the information about the geographical area can comprise a coded delimitation of the geographical area. The coded delimitation may be based on or correspond to a geohashing method, for example. By way of example, the information about the geographical area can comprise a character string that is explicitly assignable to a statement of longitude and latitude. By way of example, the character string can have a variable length. The longer the character string, the smaller the geographical area may be. By way of example, shortening the character string from a first length to a second length allows a granularity to be coarsened or a size of the geographical area to be enlarged. The geographical area defined by the character string with the first length may, by way of example, be comprised in the geographical area defined by the character string with the second length.

In at least one exemplary embodiment, the geographical area may, by way of example, be comprised in a reference system that comprises a plurality of granularities. By way of example, the plurality of granularities can represent a hierarchic relationship. The reference system can comprise a first plurality of sections in a first granularity (on the higher hierarchic level) from the plurality of granularities. Sections from the first plurality of sections (on the higher hierarchic level) can comprise a second plurality of sections in a second granularity (a lower hierarchic level). The information about the geographical area can identify at least one section that is comprised in the reference system, for example a section from a granularity. Alternatively, the information about the geographical area can identify the at least one section and sections that comprise the at least one section.

Alternatively or additionally, the information about the geographical area can identify multiple independent (for example nonoverlapping or, by way of example, adjacent) sections that define a more complex geographical area. By way of example, the information about the geographical area can identify sections from different granularities.

In at least some exemplary embodiments, it is possible to code (complex) expanses in which the measurement job is active—independently of the presence of a digital map in the vehicle.

In some exemplary embodiments, the reference system can be based, by way of example, on the geohashing method or on the navigation data standard (NDS).

By way of example, geohashes can compactly code a geoposition and the granularity used therefor. They can therefore be interpreted as a description of a "tile" (section) with a center and an edge length. A check to determine whether there is another geoposition within the tile is possible. A list of multiple geohashes can be used to describe complex location confinements, for example.

Besides geohashing, any other codings are also useable, so long as they describe an area on the earth's surface (which may correspond to the reference system, for example), e.g.
- a circle using a geographical position as the center with a defined radius
- polynomial using list of geopositions
- list of rectangles using position of the edges (degrees latitude/longitude)

In at least some exemplary embodiments, the information about the geographical area can comprise information about a position statement and information about a granularity of the position statement. The information about the granularity can indicate the extent of the geographical area around the position statement, for example. The method can further, as shown in FIG. 1a, comprise determining 115 the geographical area based on the information about the position statement and based on the information about the granularity of the position statement.

By way of example, the information about the granularity can comprise information about a size of the geographical area, for example the information about the size of the geographical area can comprise at least one element from the group comprising an edge length, a diameter, a radius and a scaling. The determining 115 of the geographical area can be based on the information about the size of the geographical area, for example. By way of example, the determining 115 can compute the geographical area on the basis of the edge length or the diameter and the position statement.

Alternatively or additionally, the information about the geographical area can comprise a plurality of position statements that define a polygon. By way of example, position statements may be defined as a longitude/latitude, or for example correspond to at least one section that is defined in the reference system.

In some exemplary embodiments, the information about the measurement job can comprise information about a plurality of geographical areas. By way of example, the information about the measurement job can comprise information about a plurality of geographical areas that are independent of one another, which are representative of a larger number of areas, for example, or the plurality of geographical areas can define a more complex geographical area in an intersection or combination, for example.

The method further comprises determining 120 whether the mobile device 100 is within the geographical area. By way of example, the determining 120 can comprise determining a position of the vehicle, for example using a locating module 16. Further, the determining 120 can comprise a comparison of the position of the mobile device with the geographical area. The determining 120 can determine whether the measurement job is relevant to the mobile device. In some exemplary embodiments, the determining 120 can comprise determining whether the mobile device 100 is within the geographical area without using digital map data (for example road map data), for example.

By way of example, the determining 120 may be independent of digital map data, for example independent of a digital road map.

In some exemplary embodiments, the method can further comprise checking whether the measurement job is relevant to the mobile device. By way of example, the relevance of the measurement job to the mobile device may be based on at least one element from the group comprising type of the vehicle, model of the vehicle, age of the mobile device and current state of the mobile device.

The method further comprises determining 130 the measurement result based on the information about the measurement job if the mobile device is within the geographical area, for example based on a sensor module 18. By way of example, the determining 130 of the measurement result can determine at least one element from the group comprising a weather outside the mobile device 100 (for example whether it is raining), a brightness outside the mobile device 100, a speed of the mobile device 100, a distance from the vehicles around the mobile device 100 and a speed profile of the mobile device 100. By way of example, the sensor module 18 can correspond to a speed sensor, an acceleration sensor, a rain sensor, a brightness sensor or a distance sensor, a temperature sensor or a tire pressure sensor. The sensor module 18 may be comprised in the apparatus 10, for example. By way of example, the determining 130 can further comprise obtaining the measurement result from a sensor module that is outside the mobile device. By way of example, a programmable mobile phone may be designed to obtain sensor data from a vehicle, for example via a short-range radio link.

The method further comprises providing 140 the information about the measurement result based on the determined measurement result.

In some exemplary embodiments, the providing 140 can take place in anonymized manner, for example. By way of example, the information about the measurement result may comprise an anonymized measurement result. By way of example, the information about the measurement result may comprise no explicit identification of the mobile device 100. In some exemplary embodiments, the information about the measurement result may not comprise the position of the mobile device 100.

In some exemplary embodiments, the providing 140 can further comprise obtaining consent from an occupant of the mobile device 100 to the providing 140, for example using an information system of the vehicle, for example an infotainment system (information and entertainment system) of the mobile device 100.

By way of example, the providing 140 can correspond to connectionless sending, for example a broadcast that is received by a traffic infrastructure using vehicle-to-infrastructure communication and is forwarded to a server, for example without identification of the mobile device 100.

By way of example, the interface 12 may be designed to communicate using a mobile communication system, for example a cellular mobile communication system.

Exemplary embodiments can therefore make use of a transceiver/mobile radio device that is designed for communicating data via a mobile radio system with a server or computer or another communication partner that is available via the internet or the worldwide web (WWW) or another network, for example. The mobile radio system may, by way of example, correspond to one of the mobile radio systems that are standardized by applicable standardization committees, such as, e.g., the 3rd Generation Partnership Project (3GPP) group. By way of example, these comprise the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN), such as, e.g., the Universal Mobile Telecommunication System (UMTS), Long Term Evolution (LTE) or LTE-Advanced (LTE-A), or else mobile radio systems of other standards, such as, e.g., Worldwide Interoperability for Microwave Access (WIMAX), IEEE802.16 or wireless local area network (WLAN), IEEE802.11, and also generally a system that is based on a time division multiple access (TDMA) method, frequency division multiple access (FDMA) method, code division multiple access (CDMA) method, orthogonal frequency division multiple access (OFDMA) method or another technology or multiple access method. The terms mobile radio system, mobile radio network and mobile communication system are used synonymously below.

By way of example, the obtaining 110 of the data message and/or the providing 140 of the measurement result can be effected using the mobile radio system.

Alternatively or additionally, the interface 12 may be designed to communicate via a vehicle-to-infrastructure communication link. By way of example, obtaining 110 the data message and/or the providing 140 of the measurement result can be effected using the vehicle-to-infrastructure communication link, for example using an IEEE 802.11p communication link (a standard of the Institute of Electrical and Electronics Engineers). By way of example, the interface 12 may be designed to communicate with at least one traffic infrastructure (also called a roadside unit) and to use the infrastructure communication link between the interface 12 and the at least one traffic infrastructure for the obtaining 110 and providing 120.

In at least some exemplary embodiments, the information about the measurement job can further comprise information about a validity period of the measurement job. The information about the validity period may be defined in relative terms (for example minutes, hours, days from the time of obtaining 110) or in absolute terms (date, time of day), for example. The method can further comprise storing 125 the measurement job during the validity period of the measurement job, for example if the mobile device is close to the geographical area. By way of example, the determining 130 of the measurement result can be carried out when the mobile device is within the geographical area at a time within the validity period of the measurement job. By way of example, the method operations of determining 120 can be repeated periodically. The storing 125 can, by way of example, be effected by the control module 14 in a memory, for example a magnetic or optical memory. By way of example, the information about the measurement job can be stored in a volatile memory, for example a main memory of the apparatus 10.

In at least some exemplary embodiments, the locating module 16 can correspond to a navigation receiver, a GPS receiver or a mobile transceiver. In some exemplary embodiments, the apparatus 10 can comprise the locating module 16. The locating module 16 may be coupled to the control module 14.

Figure 2:
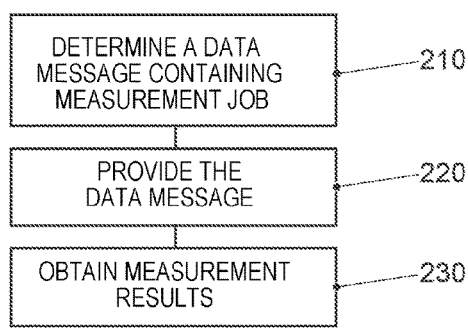
FIG. 2 illustrates a flowchart for an exemplary embodiment of a method for acquiring measurement results.
Figure 2A:
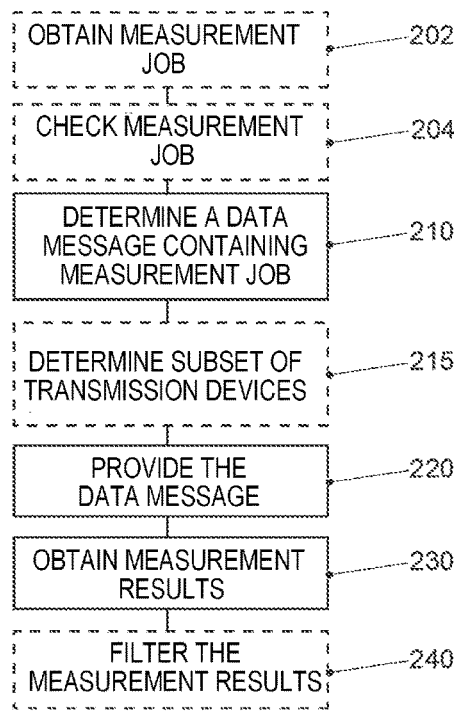
FIG. 2a illustrates a flowchart for a further exemplary embodiment of a method for acquiring measurement results.
Figure 2B:
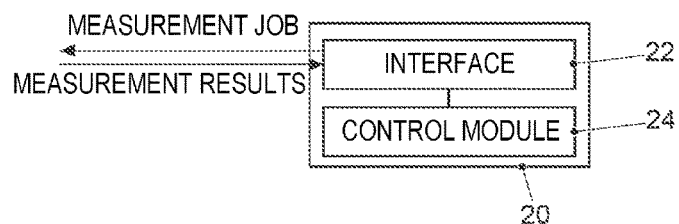
FIG. 2b illustrates a block diagram of an exemplary embodiment of an apparatus for acquiring measurement results.

In exemplary embodiments, the control module 14, and/or a control module 24 from FIG. 2b, can correspond to any controller or processor or to a programmable hardware component. By way of example, the control module 14; 24 may also be provided as software that is programmed for a corresponding hardware component. In this respect, the control module 14; 24 may be implemented as programmable hardware with appropriately adjusted software. In this case, it is possible to use any processors, such as digital signal processors (DSPs). Exemplary embodiments are not limited to one particular type of processor in this instance. Any processors or even multiple processors are conceivable for implementing the control module 14.

The interface 12, and/or an interface 22 from FIG. 2b, can correspond, by way of example, to one or more inputs and/or one or more outputs for receiving and/or transmitting information, for example in digital bit values, based on a code, within a module, between modules or between modules of different entities.

FIG. 2 illustrates a flowchart for an exemplary embodiment of a method for acquiring measurement results of a first plurality of mobile devices. The first plurality and/or a second plurality of mobile devices can comprise, by way of example, two or more mobile devices according to the description pertaining to FIG. 1. FIG. 2b illustrates a block diagram of an exemplary embodiment of an apparatus 20, designed to carry out the method for acquiring measurement results. The apparatus 20 comprises an interface 22 and a control module 24 that is coupled to the interface 22. The control module 24 is designed to carry out the method operations. The control module 24 may, by way of example, be designed to carry out the method operations at 202-240 of FIGS. 2 and 2a.

The method comprises determining 210 a data message containing information about a measurement job. The information about the measurement job comprises information about a geographical area in which the measurement job is to be carried out. By way of example, the determining 210 can comprise coding the measurement job and the information about the geographical area, for example based on one of the methods that are mentioned in the description of FIG. 1, 1a, 1b. By way of example, the method, as FIG. 1b shows, may further comprise obtaining 202 the measurement job, for example from an analysis system.

For the data collection by means of larger groups of networked mobile devices for swarm data functions, the mobile devices affected can be confined. As a rule, this also includes local confinement, e.g., mobile devices of one country can be involved in the campaign but not those from the bordering countries, e.g., because a different legal situation there prohibits this type of measurement. Complex expanses may be possible as location confinement, for example.

By way of example, the method can further comprise checking 204 the measurement job for whether the position of the second plurality of mobile devices is relevant to the measurement job. The determining 210 of the data message can be based on whether the position of the second plurality of mobile devices is relevant to the measurement job. By way of example, the data message can comprise the information about the geographical area when the latter is relevant to the measurement job, otherwise a generic geographical area (a country, a continent, everywhere) may be comprised in the data message, for example.

In at least some exemplary embodiments, it is not possible for the geoposition of the mobile devices (for example the mobile device 100) to be disclosed to the backend, for example. Exemplary embodiments can be based, by way of example, on a compact description of complex expanses on the earth's surface and a simple check to determine whether a position is comprised therein, for example by means of the determining 120 of whether the mobile device is within the geographical area from FIG. 1.

In at least some exemplary embodiments, it is possible to establish whether a mobile device is affected by the campaign. In some exemplary embodiments, this cannot take place in the backend, because this would require the mobile device to disclose its position to the backend, which may be restricted in some jurisdictions for reasons of data protection law.

In some exemplary embodiments, the mobile device itself can establish whether it is affected. To this end, the location confinement can be transmitted to the mobile device with little data volume. By way of example, the mobile device can check the location confinement against its own position (for example by means of the determining 120 of whether the mobile device is within the geographical area from FIG. 1) without resorting to a digital road map to do so.

The method further comprises providing 220 the data message containing the information about the measurement job to a second plurality of mobile devices. The second plurality of mobile devices can comprise the first plurality of mobile devices, for example. By way of example, the second plurality of mobile devices may be registered on a server when they are available via a communication link using a mobile communication system. The providing 220 can provide the data message to mobile devices that are available via the mobile communication system, for example. By way of example, the method can further comprise determining the second plurality of mobile devices, for example based on the measurement job. By way of example, the determining of the second plurality of mobile devices can select from an original set of mobile devices for the second plurality of mobile devices that satisfy criteria of the measurement job.

In at least some exemplary embodiments, the providing 220 can correspond to individual providing of the information about the measurement job. By way of example, the providing 220 can individually provide the information about the measurement job to the mobile devices that are registered on the server and available.

Alternatively, the providing 220 can correspond to broadcasting the information about the measurement job, for example via a radio network (for example, correspond to mobile radio, radio, vehicle-to-vehicle communication or vehicle-to-infrastructure communication). By way of example, the control module 14 of the mobile device may be designed to determine whether the measurement job is relevant to the vehicle, for example based on the information about the geographical area and further criteria such as, for example, vehicle type, vehicle state, available sensor modules, etc.

In some exemplary embodiments, the method can further comprise determining 215 a subset of transmission devices from a plurality of transmission devices based on the geographical area. The providing 220 (for example broadcasting) of the data message can be based on the subset of transmission devices, for example. By way of example, the determining 215 can select transmission devices from the plurality of transmission devices whose coverage areas form an intersection with the geographical area.

By way of example, the plurality of transmission devices can comprise one or more mobile radio base stations. The determining 215 of the subset of transmission devices can select at least one base station from the one or more mobile radio base stations for the subset of transmission devices if a coverage area of the at least one base station forms an intersection with the geographical area.

Alternatively or additionally, the plurality of transmission devices can comprise one or more transmission devices for a vehicle-to-infrastructure communication. The determining 215 of the subset of transmission devices can select at least one transmission device from the one or more transmission devices for the vehicle-to-infrastructure communication for the subset of transmission devices if a coverage area of the at least one transmission device forms an intersection with the geographical area.

The method further comprises obtaining 230 information about the measurement results of the first plurality of mobile devices. By way of example, the obtaining 230 can comprise providing a server service that takes on the information about the measurement results in an anonymized manner. By way of example, the information about the measurement results may, in some exemplary embodiments, allow no identification of individual mobile devices. By way of example, the information about the measurement results can comprise anonymized measurement results. In some exemplary embodiments, logging of the obtaining 230 may comprise no log entries attributable to one mobile device or one user, for example no identification of a mobile device or no temporary or static address of a transceiver of a mobile device.

In some exemplary embodiments, the method can further comprise filtering 240 the information about the measurement results, for example based on the geographical area. By way of example, the plurality of pieces of information about measurement results can comprise information about a subarea of the geographical area. The filtering may be based, by way of example, on the subarea of the geographical area. Alternatively or additionally, the filtering 240 of the information about the measurement results can eliminate measurement results for whose measurement job or geographical area there is a representative number of measurement results.

A further exemplary embodiment is a computer program for performing at least one of the methods described above when the computer program runs on a computer, a processor or a programmable hardware component. A further exemplary embodiment is also a digital storage medium that is machine-readable or computer-readable and that has electronically readable control signals that can interact with a programmable hardware component such that one of the methods described above is carried out.

The features disclosed in the description above, the claims below and the enclosed figures may be of importance, and can be implemented, both individually and in any desired combination, for the realization of an exemplary embodiment in its various configurations.

Although some embodiments have been described in connection with an apparatus, it goes without saying that these embodiments also represent a description of the corresponding method, so that a block or a component of an apparatus should also be considered as a corresponding method operation or as a feature of a method operation. Analogously to this, embodiments described in connection with or as a method operation also represent a description of a corresponding block or detail or feature of a corresponding apparatus.

Depending on particular implementation requirements, exemplary embodiments may be implemented in hardware or in software. The implementation can be performed using a digital storage medium, for example a floppy disk, a DVD, a Blu-Ray disk, a CD, a ROM, a PROM, an EPROM, an EEPROM or a flash memory, a hard disk or another magnetic or optical memory that stores electronically readable control signals that can interact or do interact with a programmable hardware component such that the respective method is performed.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a system on chip (SOC), a programmable logic element or a field programmable gate array having a microprocessor (FPGA).

The digital storage medium may therefore be machine-readable or computer-readable. Some exemplary embodiments thus comprise a data storage medium that has electronically readable control signals that are capable of interacting with a programmable computer system or a programmable hardware component such that one of the methods described herein is performed. At least one exemplary embodiment is therefore a data storage medium (or a digital storage medium or a computer-readable medium) on which the program for performing one of the methods described herein is recorded.

Generally, exemplary embodiments may be implemented as a program, firmware, computer program or computer program product having a program code or as data, wherein the program code or the data is or are operative to the effect of performing one of the methods when the program runs on a processor or a programmable hardware component. The program code or the data may, by way of example, also be stored on a machine-readable storage medium or data storage medium. The program code or the data can be present inter alia as source code, machine code or byte code and as other intermediate code.

A further exemplary embodiment is further a data stream, a signal train or a sequence of signals that represents or represent the program for performing one of the methods described herein. The data stream, the signal train or the sequence of signals may be configured, by way of example, to the effect of being transferred via a data communication link, for example via the Internet or another network. Exemplary embodiments are thus also data-representing signal trains that are suitable for sending via a network or a data communication link, wherein the data represent the program.

A program according to at least one exemplary embodiment can implement one of the methods while it is performed, for example by reading memory locations or writing a datum or multiple data thereto, as a result of which, if need be, switching processes or other processes are brought about in transistor structures, in amplifier structures or in other electrical components, optical components, magnetic components or components operating on another functional principle. Accordingly, reading a memory location allows data, values, sensor values or other information to be captured, determined or measured by a program. Therefore, by reading one or more memory locations, a program can capture, determine or measure variables, values, measured variables and other information, and by writing to one or more memory locations, it can bring about, prompt or perform an action and actuate other devices, machines and components.

The exemplary embodiments described above are merely an illustration of the principles of the embodiments. It goes without saying that modifications and variations of the arrangements and details described herein will become apparent to other persons skilled in the art. Therefore, the intention is for the disclosed embodiments to be restricted only by the scope of protection of the patent claims below, and not by the specific details that have been presented herein on the basis of the description and the explanation of the exemplary embodiments.

LIST OF REFERENCE SYMBOLS

10 Apparatus
12 Interface
14 Control module
16 Locating module
18 Sensor module
20 Apparatus 22 Interface
24 Control module
100 Vehicle
110 Obtain
115 Determine
120 Determine
125 Store
130 Determine
140 Determine
202 Obtain
204 Check
210 Determine
220 Provide
230 Obtain
240 Filter

The invention claimed is:

1. A method for providing information about a measurement result of a mobile device, the method comprising:
obtaining by a mobile device a data message containing information about a measurement job, wherein the information about the measurement job comprises information about a geographical area in which the measurement job is to be carried out, wherein the geographical area is comprised in a reference system that comprises a plurality of granularities, wherein the reference system comprises a first plurality of sections in a first granularity from the plurality of granularities, wherein sections from the first plurality of sections comprise a second plurality of sections in a second granularity, wherein the information about the geographical area identifies at least one section that is comprised in the reference system;
by the mobile device coding the mobile device's own position using the reference system;
determining by the mobile device whether the mobile device is within the geographical area when the mobile device's coded position matches the information about the geographical area;
determining the measurement result based on the information about the measurement job if the mobile device is within the geographical area; and
providing the information about the measurement result based on the determined measurement result.

2. The method of claim 1, wherein the information about the geographical area comprises a coded delimitation of the geographical area.

3. The method of claim 1, wherein the information about the geographical area identifies the at least one section and sections that comprise the at least one section.

4. The method of claim 1, wherein the information about the geographical area comprises information about the position statement and information about a granularity of the position statement, wherein the information about the granularity indicates the extent of the geographical area around the position statement, further comprising determining the geographical area based on the information about the position statement and based on the information about the granularity of the position statement.

5. The method of claim 4, wherein the information about the granularity comprises information about a size of the geographical area, and wherein the determining of the geographical area is based on the information about the size of the geographical area.

6. The method of claim 1, wherein the information about the geographical area comprises a plurality of position statements that define a polygon.

7. The method of claim 1, wherein the information about the measurement job further comprises information about a validity period of the measurement job, further comprising storing the measurement job for the validity period of the measurement job, wherein the determining of the measurement result is carried out when the mobile device is within the geographical area at a time within the validity period of the measurement job.

8. The method of claim 1, wherein the obtaining of the data message further comprises checking whether the measurement job is relevant to the mobile device, and wherein the determining of the measurement result is further based on whether the measurement job is relevant to the mobile device.

9. A method for acquiring measurement results of a first plurality of mobile devices, the method comprising:
determining a data message containing information about a measurement job, wherein the information about the measurement job comprises information about a geographical area in which the measurement job is to be carried out, wherein the geographical area is comprised in a reference system that comprises a plurality of granularities, wherein the reference system comprises a first plurality of sections in a first granularity from the plurality of granularities, wherein sections from the first plurality of sections comprise a second plurality of sections in a second granularity, wherein the information about the geographical area identifies at least one section that is comprised in the reference system;
providing the data message containing the information about the measurement job to a second plurality of mobile devices, wherein the second plurality of mobile devices comprises the first plurality of mobile devices;
obtaining information about the measurement results of the first plurality of mobile devices; and
obtaining the measurement job and checking the measurement job for whether the position of the second plurality of mobile devices is relevant to the measurement job;
wherein the determining of the data message is based on whether the position of the second plurality of mobile devices is relevant to the measurement job.

10. The method of claim 9, further comprising determining a subset of transmission devices from a plurality of transmission devices based on the geographical area, wherein the providing of the data message is based on the subset of transmission devices.

11. The method of claim 9, further comprising filtering the information about the measurement results.

12. A non-transitory computer readable medium having a program code stored therein for performing a method for acquiring measurement results of a first plurality of mobile devices when the program code is executed on a computer, a processor, a control module or a programmable hardware component, the method comprising:
determining a data message containing information about a measurement job, wherein the information about the measurement job comprises information about a geographical area in which the measurement job is to be carried out, wherein the geographical area is comprised in a reference system that comprises a plurality of granularities, wherein the reference system comprises a first plurality of sections in a first granularity from the plurality of granularities, wherein sections from the first plurality of sections comprise a second plurality of sections in a second granularity, wherein the information about the geographical area identifies at least one section that is comprised in the reference system;

providing the data message containing the information about the measurement job to a second plurality of mobile devices, wherein the second plurality of mobile devices comprises the first plurality of mobile devices;

obtaining information about the measurement results of the first plurality of mobile devices;

obtaining the measurement job and checking the measurement job for whether the position of the second plurality of mobile devices is relevant to the measurement job; and wherein the determining of the data message is based on whether the position of the second plurality of mobile devices is relevant to the measurement job.

13. A non-transitory computer readable medium having a program code stored thereon for performing a method for providing information about a measurement result of a mobile device when the program code is executed on a computer, a processor, a control module or a programmable hardware component, the method comprising:

obtaining by a mobile device a data message containing information about a measurement job, wherein the information about the measurement job comprises information about a geographical area in which the measurement job is to be carried out, wherein the geographical area is comprised in a reference system that comprises a plurality of granularities, wherein the reference system comprises a first plurality of sections in a first granularity from the plurality of granularities, wherein sections from the first plurality of sections comprise a second plurality of sections in a second granularity, wherein the information about the geographical area identifies at least one section that is comprised in the reference system;

by the mobile device coding the mobile device's own position using the reference system;

determining by the mobile device whether the mobile device is within the geographical area when the mobile device's coded position matches the information about the geographical area;

determining the measurement result based on the information about the measurement job if the mobile device is within the geographical area; and providing the information about the measurement result based on the determined measurement result.

14. An apparatus for providing information about a measurement result of a mobile device, the apparatus comprising:

an interface to obtain a data message containing information about a measurement job, wherein the information about the measurement job comprises information about a geographical area in which the measurement job is to be carried out, wherein the geographical area is comprised in a reference system that comprises a plurality of granularities, wherein the reference system comprises a first plurality of sections in a first granularity from the plurality of granularities, wherein sections from the first plurality of sections comprise a second plurality of sections in a second granularity, wherein the information about the geographical area identifies at least one section that is comprised in the reference system; and a control module to:
control the interface,
code the mobile device's own position using the reference system;
determine whether the mobile device is within the geographical area when the mobile device's coded position matches the information about the geographical area;
determine the measurement result by a sensor module based on the information about the measurement job if the mobile device is within the geographical area, and
provide the information about the measurement result by the interface based on the determined measurement result.

15. An apparatus for acquiring measurement results of a first plurality of mobile devices, the apparatus comprising:

an interface for communication with a second plurality of mobile devices, wherein the second plurality of mobile devices comprises the first plurality of mobile devices; and a control module to:
control the interface,
determine a data message containing information about a measurement job, wherein the information about the measurement job comprises information about a geographical area in which the measurement job is to be carried out, wherein the geographical area is comprised in a reference system that comprises a plurality of granularities, wherein the reference system comprises a first plurality of sections in a first granularity from the plurality of granularities, wherein sections from the first plurality of sections comprise a second plurality of sections in a second granularity, wherein the information about the geographical area identifies at least one section that is comprised in the reference system,
provide the data message containing the information about the measurement job to the second plurality of mobile devices by the interface;
obtain information about the measurement results of the first plurality of mobile devices by the interface; and
obtain the measurement job and check the measurement job for whether the position of the second plurality of mobile devices is relevant to the measurement job;
wherein the determining of the data message is based on whether the position of the second plurality of mobile devices is relevant to the measurement job.

* * * * *